No. 613,867. Patented Nov. 8, 1898.
W. G. READ.
ALMOND HULLER.
(Application filed Oct. 15, 1897.)
(No Model.) 5 Sheets—Sheet 1.

Witnesses,
Inventor,
Walter G. Read

No. 613,867.   Patented Nov. 8, 1898.
W. G. READ.
ALMOND HULLER.
(Application filed Oct. 15, 1897.)
(No Model.)   5 Sheets—Sheet 4.

Witnesses,   Inventor,
Walter G. Read
By Dewey & Co.
Attys.

THE NORRIS PETERS CO., PHOTO-LITHO., WASHINGTON, D. C.

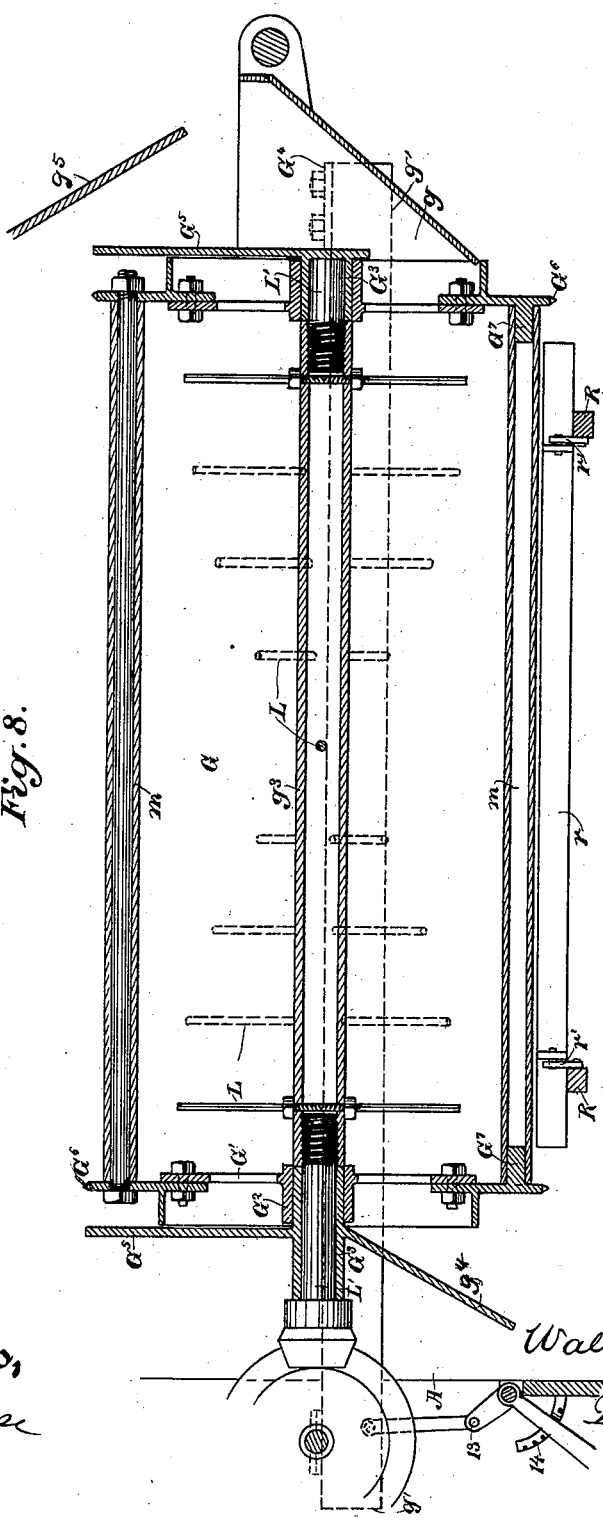

UNITED STATES PATENT OFFICE.

WALTER G. READ, OF COLUSA, CALIFORNIA.

ALMOND-HULLER.

SPECIFICATION forming part of Letters Patent No. 613,867, dated November 8, 1898.

Application filed October 15, 1897. Serial No. 655,259. (No model.)

*To all whom it may concern:*

Be it known that I, WALTER G. READ, a citizen of the United States, residing at Colusa, county of Colusa, State of California, have invented an Improvement in Almond-Hullers; and I hereby declare the following to be a full, clear, and exact description of the same.

My invention relates to an apparatus for removing the hulls from almonds and separating them and dirt, leaves, sticks, &c., so as to deliver the almonds in an essentially clean condition.

It consists in the combination of screens, rubbing devices, carriers, fans, and other mechanism, all devised and combined to work to the common end, and in details of construction, which will be more fully explained by reference to the accompanying drawings, in which—

Figure 1:
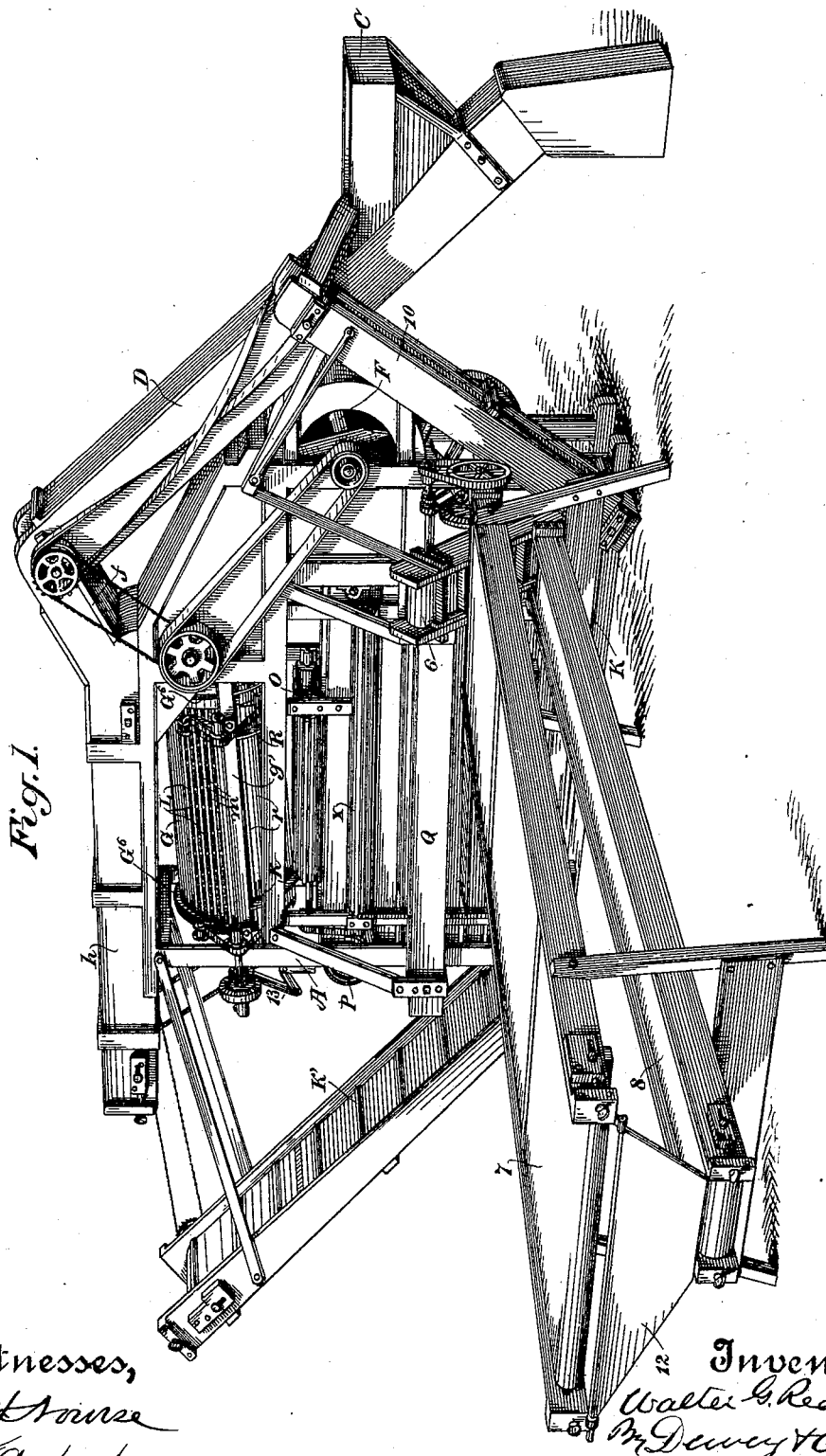
Figure 2:
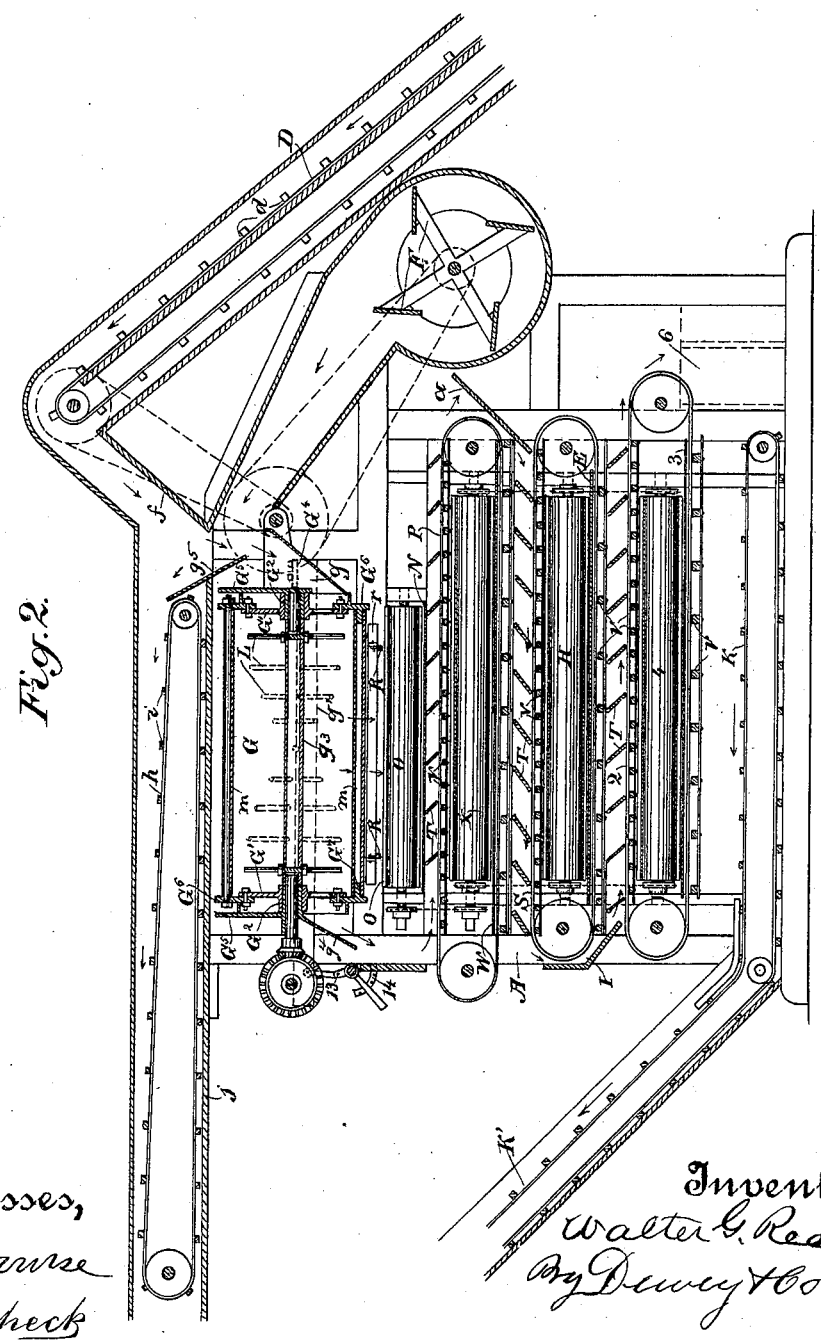
Figure 3:
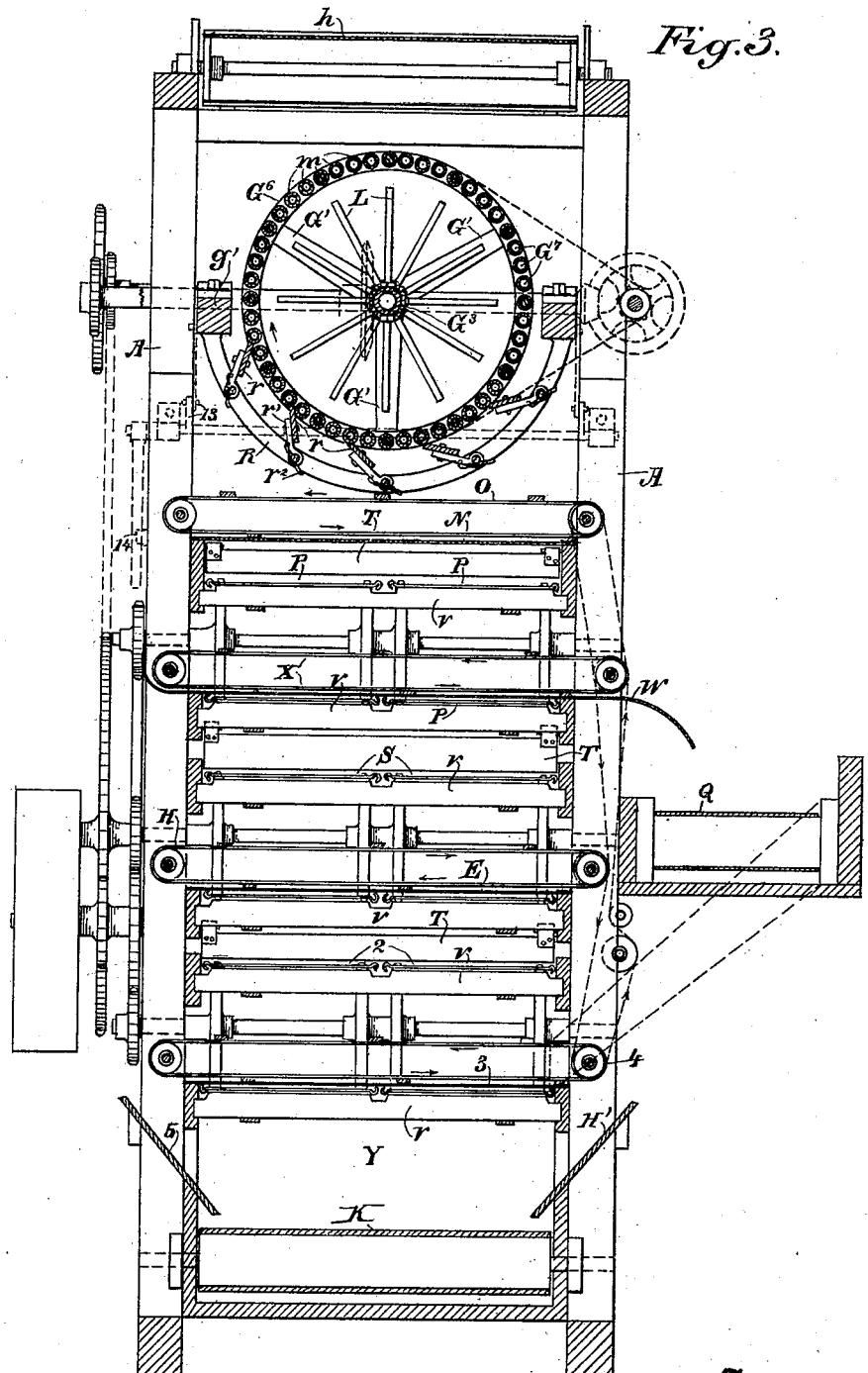
Figure 4:
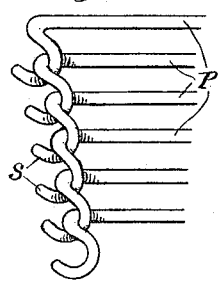
Figure 5:
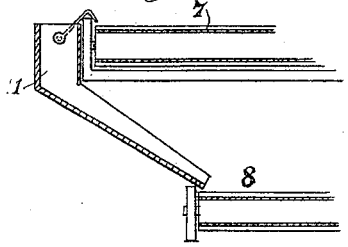
Figure 6:
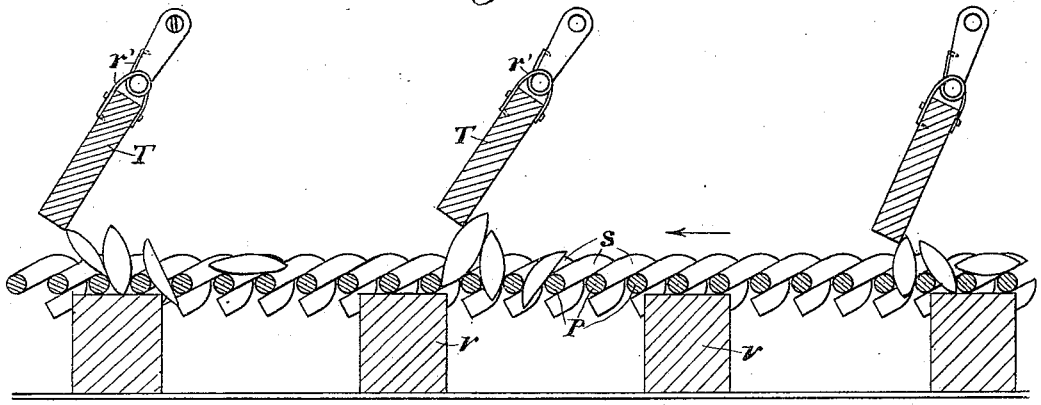
Figure 7:
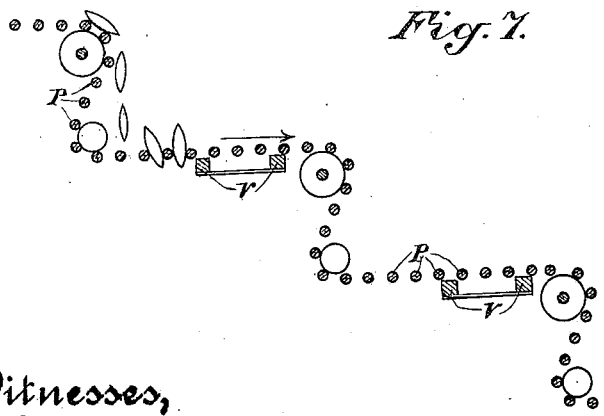

Figure 1 is an exterior perspective view of the apparatus. Fig. 2 is a longitudinal vertical section of the hulling and separating portion of the apparatus. Fig. 3 is a lateral section of the same. Fig. 4 is a detail of the end of the wire belt. Fig. 5 is a view of a pocket on the side of the horizontal discharge-belt. Fig. 6 is a detail of the floats and rubbing-bars. Fig. 7 shows the wire belt arranged in offsets. Fig. 8 is an enlarged sectional view of the threshing-cylinder and adjunctive parts.

The various parts of the mechanism are in the present case shown as supported upon a main frame A.

C is a hopper situated at a convenient height, and into this are placed the almonds with leaves and such other material as may be gathered with them from the orchard. An inclined elevator-belt D is provided with cups $d$, which carry the almonds from the hopper up to the upper end, where they fall upon an inclined chute or bottom $f$ and are directed by this into the throat $g$ of the cylinder G. A blast of wind from the fan F is directed up through the passage by which the nuts fall upon the chute $f$, and the leaves, sticks, and light material are struck by this wind-blast, which passes over an inclined wind-board $g^5$, and are blown up onto the slatted chain carrier $h$, the slats $i$ of which carry them over a floor $j$, from which they fall at the rear end upon the inclined portion $K'$ of a final discharge-draper K. The nuts pass into the cylinder or casing, and the hulls are loosened by the action of the teeth or arms L, which project radially from a central shaft rotating opposite to the cylinder and at such velocity that the blows of the teeth and the agitation caused by the movement will separate most of the hulls from the almonds. Many of these hulls will drop through the bars $m$, which form the periphery of the cylinder, these bars extending between the two cylinder-heads and being supported thereby, as will be hereinafter described. The cylinder rotates closely to slats $r$, supported by the segments R underneath, so as to operate against the bars $m$, and the action serves to draw a great many of the hulls through the bars and allows them to fall upon a pan N, from which they are raked out by slats O upon an endless traveling belt and delivered upon a draper or carrier P. The remaining nuts and hulls pass out at the rear end of the cylinder-casing, which is open at the lower part, as shown, and fall upon the upper section of the separator-rake P. This rake travels at right angles with the slat belt O, previously described, moving slowly forward, and carries the nuts and hulls upon it. This rake is in the form of a wire belt, the wires extending parallel with each other from side to side and being united by the peculiar link formation shown at $s$ at each end, which allows of a movement of the bars of the rakes favorable to the escape of the hulls without allowing the nuts to pass. The wires are sufficiently near together to support the almonds and prevent their dropping through; but the hulls will turn by reason of their curvature and peculiar shape, and the ends will project through and between the wires of the belt, and as they pass over the rub-bars V, fixed beneath the belt, these bars will catch and pull through many or most of the hulls which become turned, so that their ends project through the wires. In conjunction with these are inclined floats T, which rub upon the upper surface of the belt or its contents and assist to turn the hulls and force them through the wires, so that they will be brought into contact with the rubbing-bars V. The action of this device will be to pinch and draw the hulls through the openings, and they fall upon the second pan W and are carried out by a slat belt X and delivered upon the draper Q. This draper carries the hulls delivered to it by the slat belts O and X to the rear, where they fall into a chute Y, which delivers them upon the horizontal portion of the draper K, which is at the bottom of the machine, and they are carried out by this draper and up the inclined portion K', where they meet with the leaves and material which are previously described as having been carried out by the upper carrying-belt $h$. From the first section of the separator-rake, P, the nuts and remaining hulls fall upon an inclined board $a$, which conducts them upon the second section of the separator-rake, S, and this conveys them under a second series of inclined floats T and over a second section of rubbing-bars V, by which more of the hulls are caught and drawn through and fall upon the third pan E, being carried out by the third slat belt H, and they fall upon an inclined board H', which conducts them to the draper K before described. From the second section of the separator-rake, S, the nuts and remaining hulls fall upon an inclined board I, which conducts them to the third and last section of the separator-rake, 2. The hulls being again operated upon by the floats T and drawn through by the third section of rubbing-bars fall upon the fourth pan 3 and are carried out by the fourth slat belt 4 and fall upon an inclined board 5, which conducts them also to the draper K. All the worthless material thus gathered by this draper is carried outward and upward, as before described, and with the leaves and other dirt they are conveyed to any suitable receptacle, into which they are delivered by this draper. The nuts fall from the last section of the separator-rake into the foot of a short elevator 6, and this delivers them to an approximately horizontal carrying-belt or draper 7. If the nuts are in good hulling condition, they will come to this belt nearly clean, and a few persons standing upon each side can gather the few large hulls and unhulled nuts and drop them into a chute 11, from which they fall upon the return-draper 8, which is here shown as discharging in the opposite direction from that of the carrier 7, and it returns the unhulled nuts into the return-elevator 10 and finally into the main elevator D, and thus passes them through the machine again. The clean hulled nuts pass on and are delivered into any suitable receptacle beyond the end of the carrier 7 by a chute or direction-board 12. If the hulls are hard to remove and the greater portion of unhulled nuts are delivered upon this carrier 7, the hulled nuts can be gathered from the carrier and placed in boxes, and the chute 12 being reversed the large hulls and unhulled nuts will be delivered by this chute upon the return-carrier 8, so that they are returned again into the elevators 10 and D and on through the machine.

If the hulls are very dry and harsh, a nozzle may be inserted into the center of the upper part of the return-elevator 10 and a spray of water or steam applied to the nuts as they pass up this elevator, so as to sever the hulls and cause them to more easily separate from the nuts when they pass through the machine a second or third time.

Each end of the cylinder G is formed of arms or spokes G', extending radially from a hub $G^2$, which turns loosely upon a tubular bearing $G^3$, within which the end of the shaft L' is supported and turnable, said shaft being shown as consisting of a central portion $g^3$ and end portions screwed into the ends thereof; but I do not wish to be understood as limiting myself to this precise arrangement. This tubular bearing $G^3$ has a plate $G^4$ projecting from its exterior face, which plate is bolted to a suitable timber or support $g'$, and thus holds the hollow bearing or sleeve in its place. From the upper side of the hub $G^3$ a plate $G^5$ extends, which serves as a closure for the upper portion of the cylinder, while the lower portion at one end receives the nuts and at the other end discharges them, a direction-board $g^4$ being used at this latter end, if desired.

Around the outer ends of the spokes G' are bolted the annular rings $G^6$, which form the periphery of the cylinder. These rings have the inwardly-projecting studs $G^7$, adapted to fit into the ends of the tubular bars $m$, which form the periphery of the cylinder, or, if preferred, these tubes $m$ may be fitted upon rods which extend through them from end to end, passing through the annular rings $G^6$ and being secured in place by nuts upon the outer ends, which hold the faces of the rings against the ends of the tubes.

In order to keep the bars clean and also assist in passing the hulls between them, I prefer to fit the greater portion loosely to the studs, so that they will turn upon them, while the intermediate ones, being a little longer, will abut against the end rings and be securely locked by rods passing through them and secured by nuts. Thus if there are sixty bars forming the circumference of the cylinder every tenth one may be made one-eighth of an inch longer than the others and secured as above described, while the others are free to turn upon their studs. Another advantage derived from the use of tubular bars of considerable diameter is in the formation of valleys between the rounded sides of the bars, which greatly facilitate the passage of the curved and broken hulls between the bars.

The slats or boards $r$, which are supported by the segments R, so as to press against the outer surfaces of the bars $m$, are here shown as being bolted to castings $r'$, which are pivoted upon studs on the segments R, and springs $r^2$ are coiled about the studs, the ends being bent so as to hook, respectively, over the castings $r'$ and over the peripheries of the segments R, so as to yield and produce an elastic pressure upon the boards $r$. The inclined floats T are likewise so suspended that their edges will act continually upon the hulls passing beneath, and thus turn them so as to allow the edges of the hulls to eventually pass between the wires of the separator-rakes and be dragged through by the action of the fixed bars V beneath. The separator-rakes returning below over the similar stationary rub-bars will by the action of these bars be cleared of any hulls which may still adhere to them.

As a modification in the construction of the separator-rakes the endless chain of wires may be caused to pass over direction-pulleys, so as to fall into a series of steps, as shown in Fig. 7, each of these steps being formed of a length of the belt which passes over the rubbing-bars V, thence over the direction-pulley, and, dropping down, it forms another step or section, in like manner passing over the rubbing-bars, thus continuing over as great a length as may be desired. The operation is essentially the same as where the series of endless separating-rakes are employed, as previously described; but the bends, which in the first case are only made at the ends where the rakes pass around their supporting drums or rollers, are in this case made more frequent by the intermediate bends and the hulls are given an opportunity to change their position if they become entangled in the belt, with the chance of being swept out by the next series of rubbing-bars.

The essential feature of the operation is the dragging friction, which serves to eventually drag the hulls through either the bars of the cylinder or the spaces in the separating-rakes.

I have shown the cylinder as being driven by chains passing around sprockets at each end, so that power from the counter-shaft is applied simultaneously to both ends of the cylinder. This avoids any unequal strain upon the cylinder which would serve to twist or cramp it by reason of uneven driving.

The rear end of the cylinder-frame is supported and movable by means of a lever, as shown at 13, this lever being held by a suitable rack or holding mechanism 14, so that by moving the lever the end of the cylinder may be raised or depressed and set as desired. This will retain the nuts within the casing for different lengths of time, while the speed of rotation will be the same, the adjustment being made at any time while the machine is in operation. The separating-rakes being made of parallel wires of considerable length present less surfaces and make it less probable that the hulls will be caught and retained than where a perforated metal or wire mesh is used.

Having thus described my invention, what I claim as new, and desire to secure by Letters Patent, is—

1. An almond huller and separator consisting of the rotary cylinder formed with open spaced parallel peripheral bars, interior arms fixed to a central shaft and rotating therewith, means for delivering the unhulled almonds to said cylinder, the almonds and hulls discharging from the opposite end, rubbing-boards or floats supported so as to press against the bars of the cylinder whereby a portion of the hulls which are loosened from the nuts are drawn through between the cylinder-bars, pans upon which said hulls are received and means for constantly removing and discharging them therefrom.

2. In an almond-hulling machine, a rotary cylinder consisting of peripheral and essentially parallel bars, an interior shaft with radial arms, rotatable independently of the rotation of the cylinder and in unison therewith, means for supplying the unhulled almonds at one end of the cylinder, the greater part of the almonds and hulls discharging at the opposite end of the cylinder, rubbing-boards supported beneath the lower half of the cylinder with their edges pressing against the bars, whereby they serve as drags to remove such hulls as project between the bars, and springs adapted to press upon the boards to produce an elastic pressure thereof.

3. In an almond-hulling machine, a cylinder consisting of peripheral bars, annular rings having studs or bolts adapted to engage the ends of said bars and hold them in position with open spaces between, hubs with radial arms to the outer ends of which the rings are bolted, hollow bearings upon the periphery of which the hubs of the radial arms are rotatable and in the interior of which the central shaft which carries the arms is journaled, and means for supporting said bearings from the outside.

4. In an almond-hulling machine, a cylinder composed of peripheral and independently-turnable bars extending from between heads formed of annular rings bolted to radial arms, the hubs of which are journaled upon central hollow bearings, a central shaft having radial arms rotatable independently of the movements of the cylinder, said shaft having its ends journaled within the cylinder-bearings, and sprocket-teeth formed upon the cylinder ends, a counter-shaft with corresponding sprocket-pinions and chains passing around both sets of sprocket-wheels whereby power is transmitted to drive both ends of the cylinder equally.

5. In an almond-hulling machine, a cylinder composed of bars extending between the opposite heads having open spaces between, a central shaft with arms rotatable independently of the movement of the cylinder, means for delivering unhulled almonds to one end of the cylinder, the almonds discharging from the opposite end, exterior rubbing-boards surrounding the lower part of the cylinder and having an elastic pressure against the exterior of the cylinder-bars, and a mechanism whereby one end of the cylinder-carrying frame may be raised or depressed to change its angle and increase or decrease the rapidity with which the almonds pass through the cylinder while being acted upon by the arms or beaters.

6. An almond-huller, comprising a rotary cylinder formed with open spaced parallel peripheral bars, interior arms fixed to a central shaft and rotating therewith, means for feeding the unhulled almonds into one end of the cylinder, the almonds discharging from the opposite end, an inclined chute through which the almonds are delivered to the cylinder, a wind-blast apparatus and delivery-chute whereby a blast passes through the mass of almonds and separates the leaves and light material from the almonds, means for carrying the separated material away from the machine, and rubbing boards or devices proximate to the bars of the cylinder whereby the hulls are loosened from the nuts.

7. In an almond-hulling machine, the combination of a rotary cylinder composed of exterior peripheral open bars, an interior shaft with radial arms, means for rotating the two independently of each other, elevators or carriers whereby the almonds are delivered to the receiving end of the cylinder and a chute by which they are guided therein, a blast apparatus for forcing a current of air across the falling mass of almonds before they reach the chute and a wind-board in the path of the air-blast whereby leaves and light refuse are blown out, and a traveling slatted carrier by which said refuse is delivered away from the machine.

8. In a machine for hulling almonds, a rotary cylinder consisting of sprocket-rims and supporting radial arms with hollow peripheral bars extending between said rims and leaving uninterrupted openings between them from end to end through which the hulls can pass, means for delivering the unhulled almonds into one end of the cylinder, the almonds and hulls discharging from the opposite end, spring-pressed bars or slats the edges of which press against the lower periphery of the cylinder-bars, acting to withdraw a portion of the loosened hulls therethrough, a pan supported beneath the cylinder, and a chain of bars or slats with means for moving them over the pan, whereby the hulls discharged therein are conveyed outwardly, and a receiving-belt upon which said hulls are discharged exterior to the machine.

9. In an almond-hulling machine, an adjustably-inclined rotary cylinder composed of approximately parallel peripheral bars extending from end to end of a cylinder, a central shaft with radial arms, both shaft and cylinder being rotatable independently, means for delivering unhulled almonds to the receiving end of the cylinder, the almonds and hulls discharging from the opposite end, a pan so situated as to receive the discharged substances, separating-rakes consisting of parallel wire links united at the ends to form a chain of open wires upon which the almonds remain, rubbing-bars over which said wires pass whereby hulls which have partially passed between the wires will be dragged through, and transversely-moving carriers by which they are delivered at the side of the machine while the almonds are discharged at the end of the travel of the rake.

10. In an almond-hulling apparatus, an adjustable inclined rotary cylinder composed of parallel peripheral bars, an interior independently-rotatable shaft with radial projecting arms, means for delivering the almonds to the receiving end of the cylinder, the almonds discharging from the opposite end, a separating rake or rakes consisting of parallel wires interlocked at the ends to form a chain with smooth spaced intermediate sections upon which the almonds and hulls are received, fixed bars over which the wires pass and which serve to drag the hulls through and between the wires, and floats suspended above the separating-rakes with their lower edges adapted to drag over the rake, whereby the hulls are constantly turned and their position changed to allow the edges to pass through the spaces between the wires.

11. The combination in an almond-hulling machine of a rotary cylinder composed of peripheral spaced bars, an interior rotatable shaft, with rotary projecting arms, means for supplying unhulled almonds at the receiving end, the almonds being delivered from the discharge end, spring-pressed rubbing-bars adapted to contact with the periphery of the cylinder whereby a portion of the loosened hulls are dragged through the cylinder-bars, a carrier by which said hulls are transferred to the exterior of the machine, separating-rakes projecting beneath the discharge end of the cylinder, and chutes by which the almonds and hulls are delivered upon the first of said rakes, rubbing-bars over which the rakes pass and floats adapted to drag upon the upper surface of the rakes whereby the almond-hulls are continuously turned so that their edges will pass between the wires of the rakes to be acted upon by the rubbing-bars, a receiving-belt upon which the separated hulls are delivered, an elevator and a horizontal belt upon which the almonds are received, and a reversible chute at the outer end of said belt whereby the almonds may be discharged over the end of the belt or by which the unhulled almonds may be delivered upon a return-belt beneath, whereby they are again returned to pass through the machine.

12. In an almond-hulling machine, the combination of a rotary cylinder consisting of end heads and peripheral interspaced bars, said bars normally and independently turnable to form a rolling contact, a shaft within the cylinder and having radial arms, and means for rotating the shaft and cylinder independently of each other.

In witness whereof I have hereunto set my hand.

WALTER G. READ.

Witnesses:
  GEO. H. STRONG,
  S. H. NOURSE.